US 6,541,737 B1

(12) United States Patent
Eksin et al.

(10) Patent No.: US 6,541,737 B1
(45) Date of Patent: Apr. 1, 2003

(54) TEMPERATURE DETECTOR FOR AN AIR-CONDITIONED VEHICLE SEAT

(75) Inventors: Harun Eksin, Gäufelden (DE); Johannes Hummel, Weil der Stadt (DE); Karl Pfahler, Stuttgart (DE); Lothar Renner, Nufringen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/436,505

(22) Filed: Nov. 9, 1999

(30) Foreign Application Priority Data

Nov. 11, 1998 (DE) .......................... 198 51 979

(51) Int. Cl.[7] .............................. B60N 2/44; H05B 3/00; G01K 1/00
(52) U.S. Cl. ................. 219/217; 297/180.12; 374/208
(58) Field of Search ................. 219/217, 494, 219/528, 549, 202, 530, 540; 297/180.12; 374/208

(56) References Cited

U.S. PATENT DOCUMENTS

| 1,553,868 A | * | 9/1925 | MacDonald | 219/528 |
|---|---|---|---|---|
| 2,215,042 A | * | 9/1940 | Howard et al. | 219/528 |
| 2,921,972 A | * | 1/1960 | Kreisler et al. | 374/208 |
| 3,143,439 A | * | 8/1964 | Hansen | 374/208 |
| 3,901,080 A | * | 8/1975 | Hilborn | 374/147 |
| 4,149,066 A | * | 4/1979 | Niibe | 219/549 |
| 4,547,659 A | * | 10/1985 | Leary et al. | 219/528 |
| 4,631,391 A | * | 12/1986 | Tiepke | 219/541 |
| 4,700,684 A | | 10/1987 | Pischinger et al. | |
| 4,827,103 A | * | 5/1989 | Asp | 219/217 |
| 4,937,435 A | * | 6/1990 | Goss et al. | 219/528 |
| 5,172,979 A | * | 12/1992 | Barkley et al. | 374/147 |
| 5,408,071 A | * | 4/1995 | Ragland et al. | 219/530 |
| 5,432,322 A | * | 7/1995 | Ingram et al. | 219/528 |
| 5,934,748 A | * | 8/1999 | Faust et al. | 297/180.12 |
| 5,993,061 A | * | 11/1999 | Drouet | 374/208 |
| 6,093,910 A | * | 7/2000 | McClintock et al. | 219/217 |
| 6,186,592 B1 | * | 2/2001 | Orizaris et al. | 297/180.12 |

FOREIGN PATENT DOCUMENTS

| DE | 3732841 | * | 4/1989 |
| DE | 43 44 520 | | 6/1995 |
| DE | 38 03 748 | | 11/1996 |
| DE | 197 03 516 | | 5/1998 |
| DE | 197 26 810 | | 10/1998 |
| GB | 2 200 806 | | 8/1988 |
| JP | 62-106718 | * | 5/1987 |
| JP | 3-101782 | * | 4/1991 |

* cited by examiner

*Primary Examiner*—John A. Jeffery
(74) *Attorney, Agent, or Firm*—Crowell & Moring LLP

(57) ABSTRACT

A temperature detector for an air-conditioned vehicle seat with seat heating and/or seat ventilation is disclosed. To ensure accurate temperature measurement for regulation purposes close to the surface of the seat cushion while eliminating purely local temperature peaks, the temperature detector is provided with a flat, extended heat absorption surface, which is preferably formed by a thin, flexible layer of good thermal conductivity in which a temperature sensor in button or disc form is firmly embedded.

19 Claims, 2 Drawing Sheets

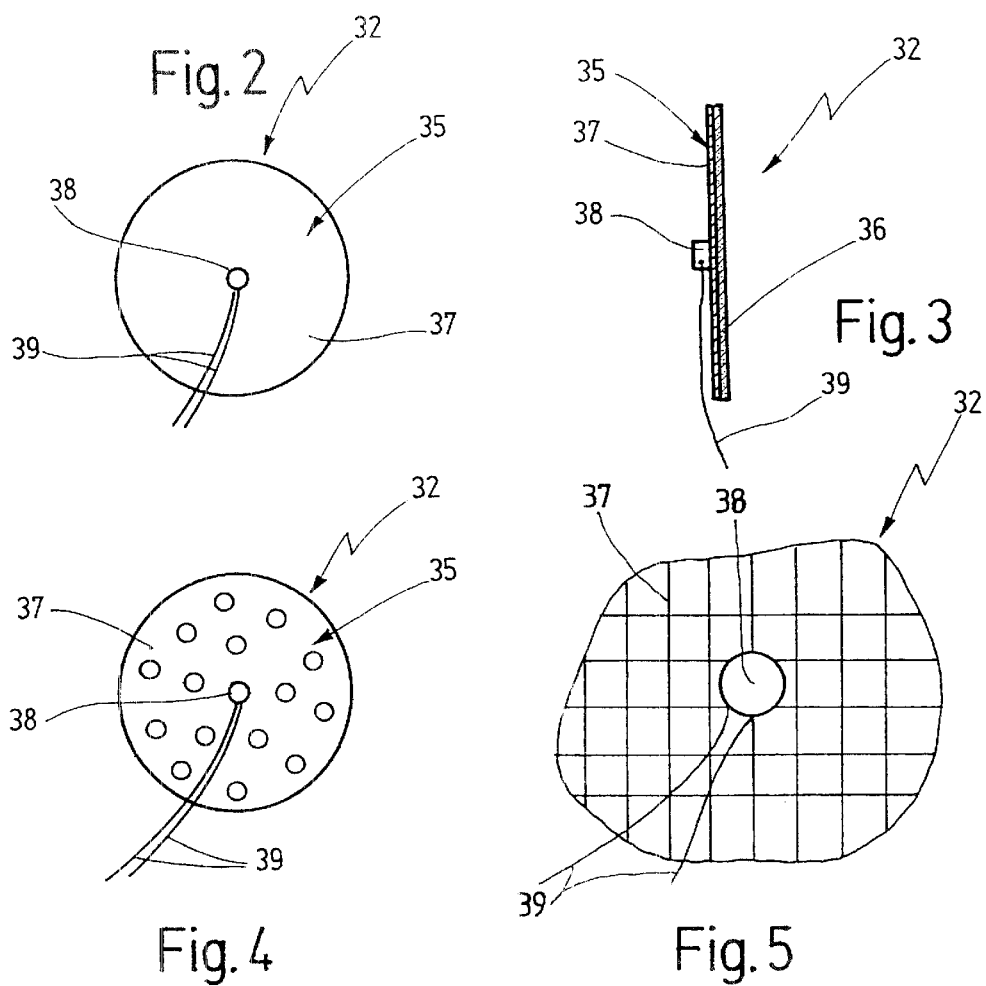
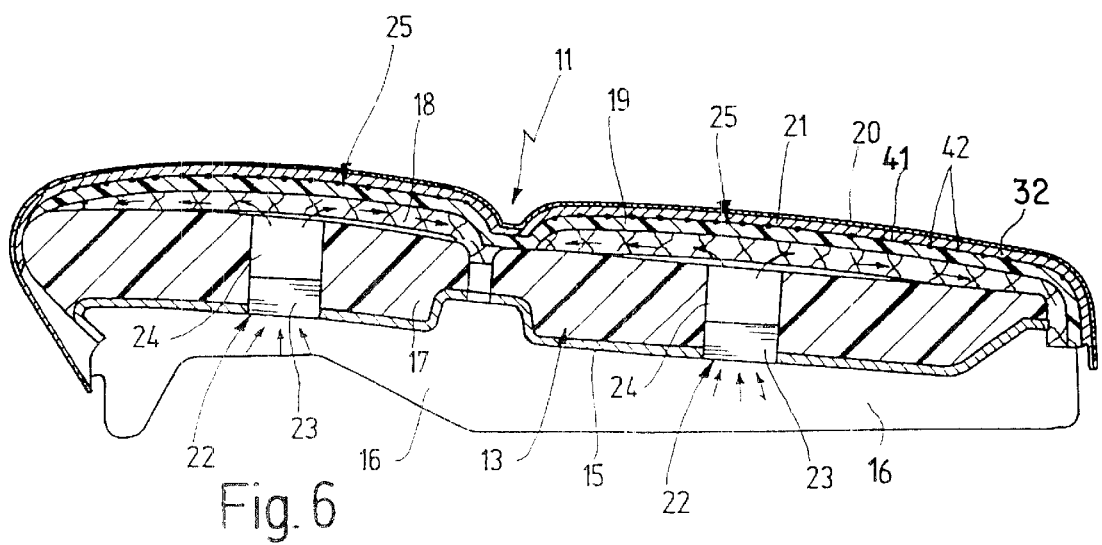

TEMPERATURE DETECTOR FOR AN AIR-CONDITIONED VEHICLE SEAT

CROSS REFERENCE TO RELATED APPLICATION

Priority is claimed with respect to German Application No. 198 51 979.6-16 filed in Germany on Nov. 11, 1998, the disclosure of which is incorporated herein by reference:

BACKGROUND OF THE INVENTION

The invention relates to a temperature detector for a vehicle seat with a seat heating system and/or seat ventilation system and to a vehicle seat with an integrated temperature detector of this kind. In a known seat heating system for a motor vehicle seat (DE 197 03 516 C1), the temperature detector, which can be obtained commercially as a spherical or disc-shaped element made from a temperature-dependent resistor material, is arranged in the lower area of the back cushion, in the pressure distribution layer of the latter, and is connected to the input of a control unit, which is connected on the output side to electric heating coils of the seat heating system. The control unit controls the on time of the seat heating system in accordance with a specified control algorithm as a function of the temperature at the surface of the back cushion, measured by the temperature detector.

Such commercially available temperature detectors allow only the local temperature to be detected and this is subject to severe fluctuations, especially when the seat is occupied, and can vary widely from one point to another. This leads to distortion of the actual temperature value fed to the temperature-regulating system and to correspondingly deficient temperature regulation which does not meet high requirements on the comfort of the seat.

SUMMARY OF THE INVENTION

The object on which the invention is based is to provide a temperature detector of the type stated at the outset which reliably performs more accurate temperature measurement for regulation purposes and does this close to the surface of the seat while eliminating purely local temperature peaks.

According to the invention, the object is achieved by means of a flat, extended heat absorption surface.

The temperature detector according to the invention has the advantage of detecting the temperature at the surface of the seat over a wide area, thus minimizing interfering effects such as the temperature detector being acted upon on one side, the occupant side. It is thereby possible to measure the temperature as close as possible to the user of the seat, thus coming significantly closer to the goal of temperature regulation, namely to keep the temperature of the seat constant in the same range as the skin temperature.

Advantageous embodiments of the temperature detector according to the invention with expedient refinements and developments of the invention will become apparent from the further claims.

According to an advantageous embodiment of the invention, the heat absorption surface is formed by a thin, flexible layer of very good thermal conductivity into which a temperature sensor, e.g. a PTC or NTC resistor, in button or disc form is firmly embedded. The advantage of this flat construction resides in the fact that the temperature detector does not leave a visible imprint on the surface of the seat and there is therefore no problem in arranging the temperature detector directly under the cushion cover. The layer of good thermal conductivity can advantageously be produced by means of an aluminium foil but can also be produced from aluminium powder. An outside diameter of about 40 mm is sufficient to achieve the desired advantages.

According to an advantageous embodiment of the invention, the heat-conducting layer is perforated or in the form of a latticework structure. The air permeability thus obtained for the large-area heat absorption surface has the advantage of minimizing condensation and evaporation of moisture on the heat absorption surface and temperature fluctuations caused thereby.

In the case of a vehicle seat which is fitted with a temperature detector as described above, an advantageous embodiment of the invention is obtained if the temperature detector, the heat absorption surface of which is provided on one side with a layer of good thermal conductivity, is integrated in such a way into the cushion that the thermal insulating layer faces away from the cushion cover, thereby ensuring that the temperature detector is shielded on the ventilation side.

If the seat heating system has an electric heating mat, which is generally arranged under the cushion cover, then, according to another embodiment of the invention, the temperature detector is an integral part of the heating mat.

According to an advantageous embodiment of the invention, a temperature-regulating device forming part of the seat heating system is supplied with a desired value for the seat surface temperature, is connected on the input side to the temperature detector and an external detector, which is arranged on the vehicle and detects the outside temperature, and, on the output side, to the seat heating system. The temperature-regulating device regulates the surface temperature of the seat in accordance with the specified desired value and corrects the desired value as a function of the temperature value measured by the external detector. These design measures contribute to better adjustment of the seat climate to the heat sensitivity of the occupant, thus ensuring that any manual interventions that he makes in the seat-climate setting are kept to a minimum. By adapting the desired temperature value to the outside temperature, e.g. by setting the desired value for the seat surface temperature to 35° C. in summer, when the outside temperature is above 20° C., and to 36° C. in the cold part of the year, when the outside temperature is below 20° C., allowance is made for the differences in human temperature sensitivity according to the season.

BRIEF DESCRIPTION OF THE DRAWING

The invention is described in greater detail below with reference to embodiment examples illustrated in the drawing, in which, in each case in schematic representation:

FIG. 2 shows a plan view of a temperature detector integrated into the vehicle seat shown in FIG. 1, FIG. 3 shows a side view of the temperature detector in FIG. 2, FIG. 4 shows a plan view of the temperature detector in accordance with another embodiment example, FIG. 5 shows a plan view of part of the temperature detector in accordance with a third embodiment example, on an enlarged scale, FIG. 6 shows a longitudinal section through a squab component of a vehicle seat in accordance with another embodiment example.

DETAILED DESCRIPTION OF THE PREFERRED EMBODIMENTS

Figure 1:
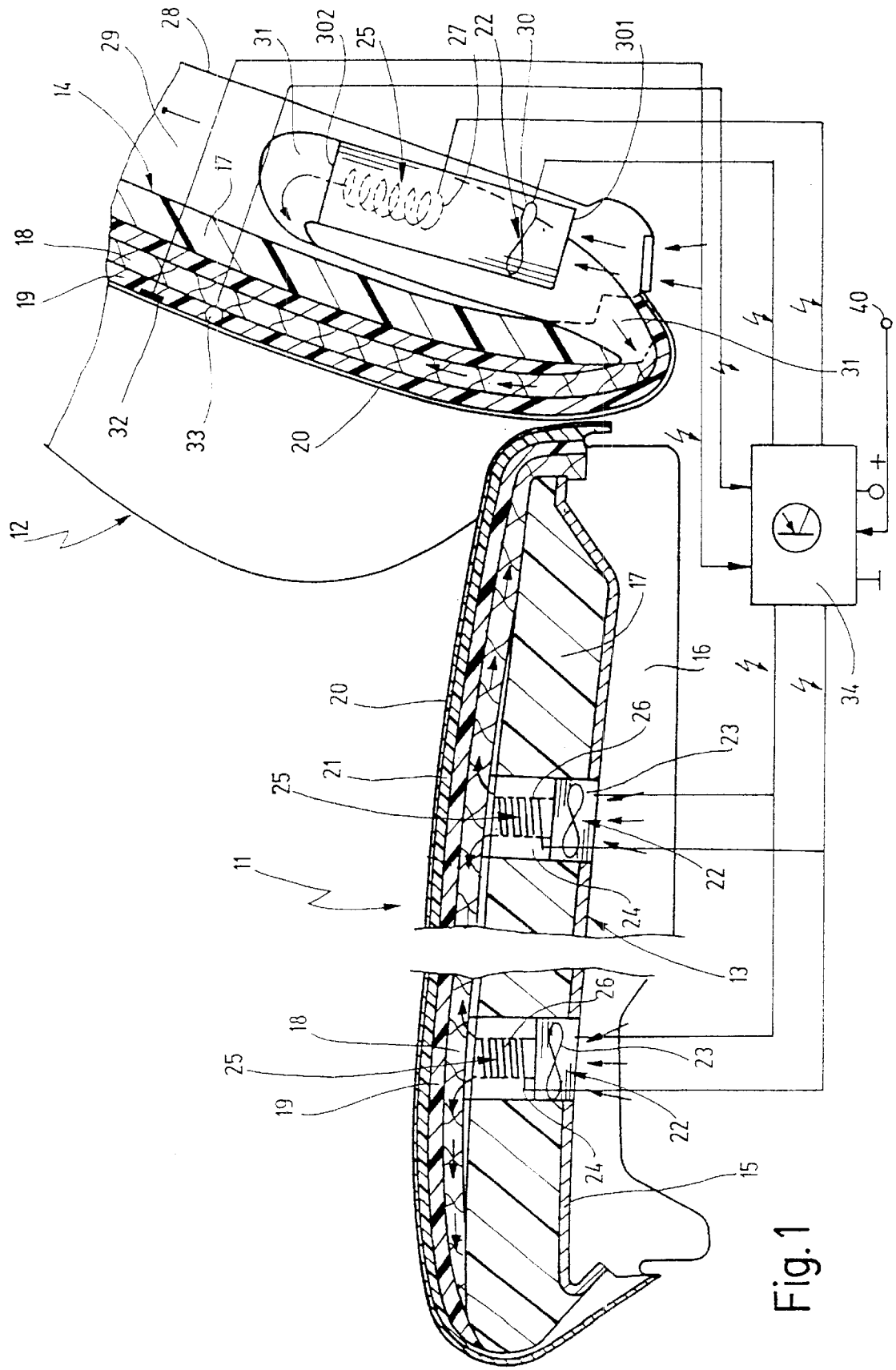
FIG. 1 shows parts of a longitudinal section through a vehicle seat with seat heating and a seat ventilation device.

The vehicle seat shown in longitudinal section in FIG. 1 has, as is familiar, a squab component 11 which is held adjustably on the vehicle floor, and a backrest 12, which is connected pivotably to the squab component 11 by a latching pivot mechanism (not shown here) for tilt adjustment. The squab component 11 and the backrest 12 each have a cushion 13 and 14 respectively. The cushion 13 of the squab component 11 is secured on a cushion carrier 15, which is here designed as a spring core of spring wire and is mounted in a frame 16 of the squab component 11. The seat cushion 13 comprises a cushion pad 17, which rests on the cushion carrier 15, a ventilation layer 18 made of coarse-knit spacing fabric which covers the cushion pad 17 over its entire area and can be flooded with air, an air-permeable distribution layer 19, which rests on the ventilation layer 18, and an air-permeable cushion cover 20 which covers the surface of the seat cushion 13. A cover filling 21 made of cotton wool or non-woven material is incorporated between the cushion cover 20 and the pressure distribution layer 19.

Arranged in the cushion pad 17 is a plurality of air channels 24, each of which penetrates the cushion pad 17 from the top side, that facing the ventilation layer 18, to its bottom side, that facing away from the ventilation layer 18. Arranged in each air channel 24 is a miniature fan or miniature blower 23 of a seat ventilation device 22 and an electric heating coil 26 of a seat heating system 25.

The back cushion 14 of the backrest 12 is embodied with a backrest face and two lateral bolsters. A cavity 29, which is open at the bottom end of the backrest 12, is provided between the backrest cushion 14 and an air-impermeable rear wall 28. Arranged in the cavity 29 is a central fan 30, the intake opening 301 of which faces downwards to the open end of the cavity 29 and the delivery opening 302 of which is connected to a flexible duct 31. A heating coil 27 of the seat heating system 25 is arranged upstream of the delivery opening 302 of the fan 13. As in the case of the squab component 11, the back cushion 14 is secured on a cushion carrier (not shown here) and has a cushion pad 17, a ventilation layer 18, which covers the latter over its entire area, a pressure distribution layer 19, which is arranged on the ventilation layer 18, and an air-permeable cushion cover 20 which covers the surface of the cushion. In the area of the cushion face, at the bottom end, the ventilation layer 18 is extended beyond the cushion pad 17 and connected to the flexible duct 31. Arranged in the lower area of the back cushion 14, in the pressure distribution layer 19, is a temperature detector 32 and, if appropriate, also a moisture meter 33, being arranged in such a way that it lies approximately in the lumbar region of seat users of different sizes.

To set a comfortable seat climate, a control unit 34 is provided, this being connected on the input side to the temperature detector 32 and the moisture meter 33 and, on the output side, to the electric circuits of the seat ventilation device 22 and the seat heating system 25.

For highly accurate measurement of the cushion surface temperature, the temperature detector is provided with a flat, extended heat absorption surface 35 (FIG. 2), to one side of which a layer 36 with good thermal insulation properties is applied by coating or adhesive bonding. The insulating layer 36 is composed of plastic or cardboard. The heat absorption surface 35 is formed by a thin, flexible layer 37 of good thermal conductivity into which a temperature sensor 38 in button or disc form is firmly embedded. This temperature sensor can be a commercially available PTC or NTC resistor, which is connected to the control unit 34 by two pigtail leads 39. An aluminium foil can be used as a heat-conducting layer 37. However, the heat-conducting layer 37 can also be produced from aluminium powder.

In the embodiment example of the temperature detector 32 in FIG. 2, the heat-conducting layer 37 has a continuous surface. In the embodiment example of the temperature detector 32 in FIG. 4, the heat-conducting layer 37 is perforated and, in the embodiment example of the temperature detector 32 in FIG. 5, the heat-conducting layer 37 has a latticework structure. The air permeability of the heat-conducting layer 37 in the embodiment examples in FIGS. 4 and 5 has the advantage that condensation and evaporation of moisture on the heat absorption surface 35 used for temperature measurement is largely suppressed and hence temperature fluctuations caused by this at the measuring surface are minimized. On all the temperature detectors 32, the heat-conducting layer 37 has a diameter of about 40 mm, for instance.

As can be seen from FIG. 1, the temperature detector 32 is arranged directly under the cushion cover 20, i.e. as close as possible to the point at which the seat temperature is to be measured. This arrangement of the temperature detector 32 is made possible by its flat construction since this means that the temperature detector 32 does not leave a visible mark or imprint on the surface of the seat. In this configuration, the temperature detector 32 is arranged in such a way that its thermal insulating layer 36 faces away from the cushion cover 20, i.e. towards the ventilation layer 18. This ensures that the temperature detector 32 is shielded on the ventilation side, thus preventing its measurements from being distorted by the air blowing through the ventilation layer 18 and the pressure distribution layer 19.

The control unit 34 is also connected on the input side to an external detector 40 which detects the ambient temperature. Integrated into the control unit 34 is a temperature regulator which is supplied with a desired value and adjusts the surface temperature of the seat cushion 13 and the back cushion 14 to the specified desired value. Here, the desired value is corrected in the control unit 34 as a function of the temperature value supplied by the external detector 14. The correction can be performed in such a way that, at an external temperature of below 20° C., the desired value is set to 36° C., for example, and, at an external temperature above 20° C., the desired value is lowered to 35° C., for example. This adjustment of the temperature to be established at the surface of the seat allows for the temperature sensitivity of the user of the seat depending on the time of year.

The squab component 11 illustrated in longitudinal section in FIG. 6, which forms part of a modified vehicle seat, is largely identical to the squab component 11 illustrated in FIG. 1 and, to this extent, identical components are provided with identical reference numerals. The construction of the seat cushion 13 corresponds to that in FIG. 1, and this also applies to the seat ventilation device 22. The seat heating system 25 is modified insofar as the heating coils in the air ducts 24 are omitted and replaced by a heating mat 41, which is arranged in the seat cushion 13 between the pressure distribution layer 19 and the cushion cover 20 and replaces the cover filling of the cushion 13 in FIG. 1. In FIG. 6, the electric heating wires, which are generally laid in a meandering patter, are denoted by 42. Given the integration of such a heating mat 41 into the seat cushion 13, the temperature detector, which is shown here and denoted by 32 in FIGS. 1–6, can be arranged in the heating mat 41 and be an integral component of the heating mat 41.

While the above description constitutes the preferred embodiment of the invention, it will be appreciated that the invention is susceptible to modification, variation, and change without departing from the proper scope or fair meaning of the accompanying claims.

What is claimed is:

1. A temperature detector for a temperature controlled vehicle seat, comprising:
   a thin, flexible thermally conductive layer, which forms a flat, extended heat absorption surface and is made of material with high thermal conductivity, and
   a temperature sensor arranged on said thermally conductive layer,
   wherein the temperature sensor, which is a pill or disk shape, is firmly embedded in the thermally conductive layer,
   wherein on a side of the thermally conductive layer, which faces away from the temperature sensor, a thermal insulating layer made of material with high thermal insulation properties is applied, and
   wherein the thermal insulating layer is applied to the heat absorption surface by adhesive bonding.

2. A temperature detector for a temperature controlled vehicle seat, comprising:
   a thin, flexible thermally conductive layer, which forms a flat, extended heat absorption surface and is made of material with high thermal conductivity, and
   a temperature sensor arranged on said thermally conductive layer,
   wherein the temperature sensor, which is a pill or disk shape, is firmly embedded in the thermally conductive layer,
   wherein on a side of the thermally conductive layer, which faces away from the temperature sensor, a thermal insulating layer made of material with high thermal insulation properties is applied, and
   wherein the thermal insulating layer is applied to the heat absorption surface by a coating.

3. A temperature detector for a temperature controlled vehicle seat, comprising:
   a thin, flexible thermally conductive layer, which forms a flat, extended heat absorption surface and is made of material with high thermal conductivity, and
   a temperature sensor arranged on said thermally conductive layer,
   wherein the temperature sensor, which is a pill or disk shape, is firmly embedded in the thermally conductive layer,
   wherein on a side of the thermally conductive layer, which faces away from the temperature sensor, a thermal insulating layer made of material with high thermal insulation properties is applied, and
   wherein the thermal insulating layer is constructed of plastic.

4. A temperature detector for a temperature controlled vehicle seat, comprising:
   a thin, flexible thermally conductive layer, which forms a flat, extended heat absorption surface and is made of material with high thermal conductivity, and
   a temperature sensor arranged on said thermally conductive layer,
   wherein the temperature sensor, which is a pill or disk shape, is firmly embedded in the thermally conductive layer,
   wherein on a side of the thermally conductive layer, which faces away from the temperature sensor, a thermal insulating layer made of material with high thermal insulation properties is applied, and
   wherein the thermal insulating layer is constructed of cardboard.

5. A temperature detector for a temperature controlled vehicle seat, comprising:
   a thin, flexible thermally conductive layer, which forms a flat, extended heat absorption surface and is made of material with high thermal conductivity, and
   a temperature sensor arranged on said thermally conductive layer,
   wherein the temperature sensor, which is a pill or disk shape, is firmly embedded in the thermally conductive layer,
   wherein on a side of the thermally conductive layer, which faces away from the temperature sensor, a thermal insulating layer made of material with high thermal insulation properties is applied, and
   wherein the temperature sensor is electrically resistive.

6. The temperature detector according to claim 5, wherein the thermally conductive layer is constructed of aluminum foil.

7. The temperature detector according to claim 6, wherein the thermally conductive layer has a diameter of about forty millimeters.

8. The temperature detector according to claim 6, wherein the thermally conductive layer is constructed with a continuous surface.

9. The temperature detector according to claim 6, wherein the thermally conductive layer is constructed with a perforated surface.

10. The temperature detector according to claim 6, wherein the thermally conductive layer is constructed as a lattice.

11. The temperature detector according to claim 5, wherein the thermally conductive layer is produced from aluminum powder.

12. The temperature detector according to claim 11, wherein the thermally conductive layer has a diameter of about forty millimeters.

13. The temperature detector according to claim 5, wherein the thermally conductive layer is constructed with a continuous surface.

14. The temperature detector according to claim 5, wherein the thermally conductive layer is constructed with a perforated surface.

15. The temperature detector according to claim 5, wherein the thermally conductive layer is constructed as a lattice.

16. The temperature detector according to claim 5, wherein the thermal insulating layer faces away from a cushion cover of the seat.

17. A temperature controlled vehicle seat, comprising:
    a cushion,
    a cushion cover and a heating system in the form of an electrical heating mat arranged under the cushion cover, and
    a temperature detector arranged between the heating mat and the cushion cover, the temperature detector having a flat, flexible, extended and thermally conductive layer as a heat absorption surface, a temperature sensor and a thermal insulating layer that faces away from the cushion cover,
    wherein the thermally conductive layer is made of a material with high thermal conductivity, the temperature sensor being arranged firmly embedded in said thermally conductive layer and is a pill or disk shape, and wherein the thermal insulating layer is disposed on a side of the thermally conductive layer which faces away from the temperature sensor, the insulating layer being made of material with high thermal insulation properties.

18. The temperature controlled vehicle seat according to claim 17, wherein the temperature detector is an integral part of the heating mat.

19. A temperature controlled vehicle seat, comprising:

a cushion, a cushion cover, and a heating system in the form of an electrical heating mat arranged under the cushion cover, and a temperature detector arranged between the heating mat and the cushion cover, the temperature detector having a flat, flexible, extended and thermally conductive layer as a heat absorption surface, a temperature sensor and a thermal insulating layer that faces away from the cushion cover, wherein the thermally conductive layer is made of a material with high thermal conductivity, the temperature sensor being arranged firmly embedded in said thermally conductive layer and is a pill or disk shape, wherein the thermal insulating layer is disposed on a side of the thermally conductive layer which faces away from the temperature sensor, the insulating layer being made of material with high thermal insulation properties, wherein a temperature-regulating device, which is supplied with a desired value for the seat surface temperature, is connected on the input side to the temperature detector and an external detector, which is arranged on the outside of the vehicle and detects the outside temperature, and, on the output side, to the seat heating system, and wherein the temperature-regulating device regulates the cushion surface temperature in accordance with the desired value and corrects the desired value as a function of the temperature value measured by the external detector.

* * * * *